L. S. CHADWICK.
AUTOMOBILE SPRING.
APPLICATION FILED JULY 16, 1908.
909,365.
Patented Jan. 12, 1909.
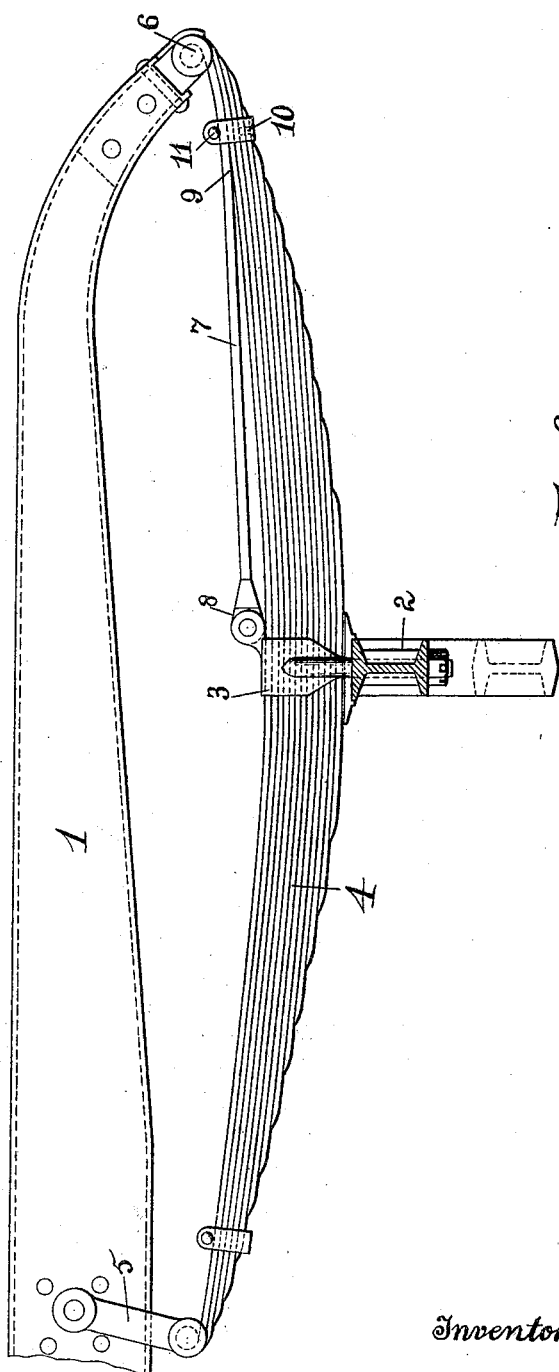
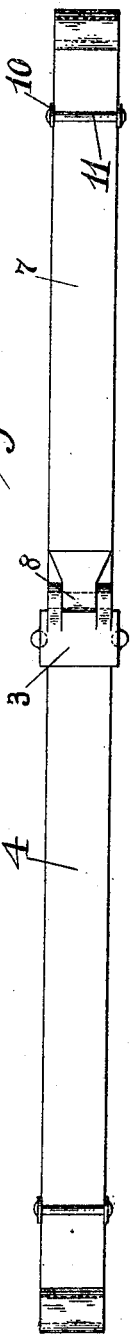

UNITED STATES PATENT OFFICE.

LEE S. CHADWICK, OF POTTSTOWN, PENNSYLVANIA.

AUTOMOBILE-SPRING.

No. 909,365.

Specification of Letters Patent.

Patented Jan. 12, 1909.

Application filed July 16, 1908. Serial No. 443,869.

*To all whom it may concern:*

Be it known that I, LEE S. CHADWICK, a citizen of the United States, residing at Pottstown, Pennsylvania, have invented certain new and useful Improvements in Automobile-Springs, of which the following is a specification.

As is well known by automobilists and those skilled in the art, the front springs of a car are subject, more or less, to breakage in the center directly under the clip which connects the spring with the axle. In case of breakage and with the car going at high speed, the entire steering axle is liable to slide back under the car and cause a smashup.

It is the object of my invention to provide means for holding the axle in position in case the forward spring breaks as above mentioned, and for this purpose I provide a radius bar or rod extending from the frame of the machine to the clip which secures the spring to the axle, and in the preferred form of my invention I utilize the top leaf of the forward spring to act as this radius bar.

The invention consists in the features and combination and arrangement of parts hereinafter described and particularly pointed out in the claims.

In the accompanying drawing,—Figure 1 represents a side view of a part of the frame of an automobile with a spring in place and with my improvement associated therewith; Fig. 2 is a plan view of the spring with its radius bar.

In this drawing, 1 indicates the side bar of the frame, 2 the axle, 3 the clip for securing the spring to the axle. This spring 4 is of substantially ordinary form with the exception hereinafter noted. It is hung at its rear end in the usual manner from the frame by a free link 5 and its front end is pivotally attached to the down turned tapered end of the side bar of the frame at 6.

It will be noted that the top leaf 7 of the spring is pivotally connected at its rear end 8 to an ear or ears on the clip 3. It is arranged with a free space between itself and the next lower leaf of the spring for the greater part of its extent, and from the point 9 to the end of the spring it is in contact with the main body of the spring, but this leaf and the main body of the spring can have relative sliding movement, the one on the other. They are connected together for this purpose by means of a clip 10 riveted or otherwise secured to the main part of the spring and having a rod or bar 11 extending over the upper leaf of the spring in such manner as to permit a longitudinal sliding movement of the main or under part of the spring in relation to the top leaf. It will now be seen that the top leaf of the spring acts as a radius or tie bar which will hold the axle in position and prevent it from sliding to the rear in case the spring breaks, and as there is one of these radius or tie bars at each side of the car the axle will be held at all times against deflection from its true transverse position.

While I have described the radius bar as being a part of the spring, it will be understood that it has little or no function to perform other than to act as a tie rod for properly locating the axle and maintaining this relation in respect to the forward end of the frame. This top leaf or tie bar is largely relieved of the strain resulting from the weight of the car and this is particularly true of its rear portion, which is free to pivot as the axle and middle portion of the spring recedes from and approaches the frame under the varying weights and strains incident to the running of the car over uneven roads.

It will be noted that the tie bar is made slightly heavier than the leaves of the main portion of the spring. It can be made extremely heavy if desired and have no spring action whatever, the spring effect being derived entirely from the lower member which is a spring complete in itself. The front end of this heavy unyielding tie rod or upper member will furnish a bearing for the end of the lower spring member substantially in the manner illustrated while the rear part would be elevated in respect to the lower member or portion of the spring as above described.

With my improvement it will be noted a tie or radius bar is associated with the spring member in such a way as to be compact, and occupy no more space than substantially that occupied by the ordinary spring. I do not, however, limit myself, except as hereinafter particularly set forth in the claims, to the details of construction, arrangement or relation of the parts shown and described.

Instead of having the spring arranged as shown, it may be reversed in position, the free link being arranged at the front instead of at the rear.

I claim as my invention:—

1. In combination with the frame, axle and supporting spring, a radius bar pivotally connected to the frame and axle and arranged over and in contact with the spring, substantially as described.

2. In combination with the frame, axle and spring, a radius bar arranged in the same vertical plane with and extending over the spring, one end of said bar being pivotally connected to the frame and the other end pivotally connected to the clip which secures the spring to the axle, substantially as described.

3. In combination the frame axle and supporting spring, a radius bar extending over the spring, pivotally connected to the axle and to the frame, said radius bar at one end affording a bearing for the end of the spring, substantially as described.

4. In combination with the frame, axle and supporting spring, a radius bar pivotally connected to the axle and to the frame and affording a sliding bearing at one end for the spring and means for connecting the end of the radius bar with the end of the spring but to allow relative sliding movement, substantially as described.

5. In combination with the frame, axle and supporting spring, a radius bar pivotally connected to the axle and to the frame and affording a sliding bearing at one end for the spring and means for connecting the end of the radius bar with the end of the spring but to allow relative sliding movement, said means consisting of the clip embracing the spring and radius bar and attached to one of said parts, substantially as described.

6. In combination with the frame, axle and supporting spring, a radius bar overlying the spring and bearing thereon at one end slidably, the other end of said radius bar being elevated in respect to the spring, said radius bar being pivotally connected at its ends with the frame and axle respectively, substantially as described.

7. In combination with the frame, axle and supporting spring, a radius bar overlying the spring and bearing thereon at one end slidably, the other end of said radius bar being elevated in respect to the spring, said radius bar being pivotally connected at its ends with the frame and axle respectively, and constituting an upper leaf of said spring, substantially as described.

8. In combination with the frame, axle and supporting spring, the link connection between the rear end of the spring and the frame, a radius bar overlying the spring and bearing thereon at its front end slidably, the rear end of said radius bar being pivotally connected to the axle clip and being pivotally connected at its front end to the frame, substantially as described.

In testimony whereof, I affix my signature in presence of two witnesses.

LEE S. CHADWICK.

Witnesses:
 JOHN T. NICHOLS,
 JESSE R. EVANS.